United States Patent [19]

Check

[11] 3,977,115

[45] Aug. 31, 1976

[54] ADJUSTABLE LINE FLOAT

[76] Inventor: Axel Check, 5040 N. Lowell Ave., Chicago, Ill. 60630

[22] Filed: May 14, 1975

[21] Appl. No.: 577,217

[52] U.S. Cl............................... 43/43.11; 43/44.87
[51] Int. Cl.².......................................... A01K 93/00
[58] Field of Search......................... 43/43.11, 44.87

[56] References Cited
UNITED STATES PATENTS

| 541,789 | 6/1895 | Kunzelman | 43/43.11 |
| 779,937 | 1/1905 | Holt | 43/43.11 |
| 2,479,642 | 8/1949 | Schiffmann | 43/43.11 |
| 3,866,346 | 2/1975 | Schneider | 43/44.87 |

Primary Examiner—Louis G. Mancene
Assistant Examiner—Daniel J. Leach
Attorney, Agent, or Firm—J. R. Halvorsen

[57] ABSTRACT

An adjustable line float for use on a fishing line; the device comprising a plastic float having a spool for holding a secondary fishing line, the spool including two adjusting slots so to adjust the secondary fishing line to any specific depth in the water and the device also including a locking and release collar for releasing a trigger holding a weighted ring, leader, and hook used in operation of the device.

10 Claims, 3 Drawing Figures

U.S. Patent  Aug. 31, 1976  3,977,115

ADJUSTABLE LINE FLOAT

BACKGROUND OF THE INVENTION

This invention relates generally to fishing equipment. More specifically, the present invention relates to fishing line floats.

A principal object of the present invention is to provide an adjustable line float which may be used with a casting rod or the like, and where after a long cast is made a certain depth water can be reached by a hook.

Other objects are to provide an adjustable line float which is simple in design, inexpensive to manufacture, rugged in construction, easy to use and efficient in operation.

These and other objects will be readily evident upon a study of the following specification and the accompanying drawing.

TECHNICAL DESCRIPTION OF THE INVENTION

Figure 1:
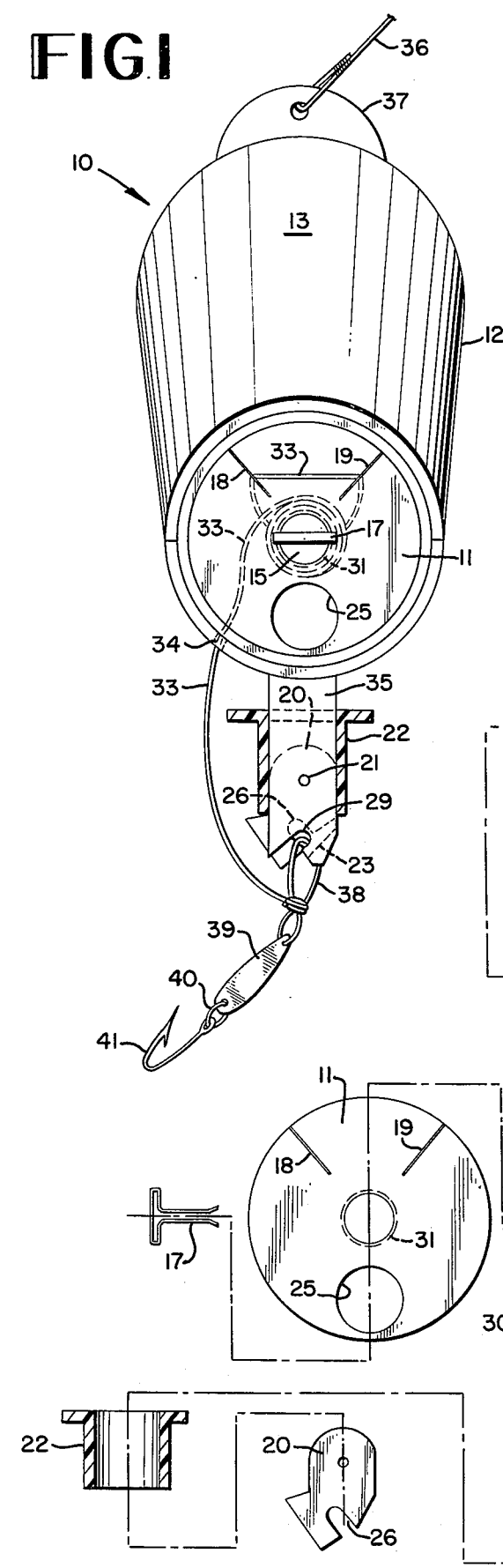
FIG. 1 is an elevational assembly view in partial section of the present invention.
Figure 3:
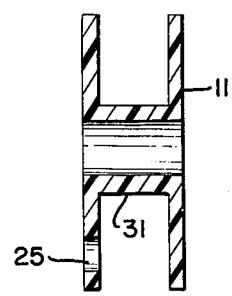
FIG. 3 is a cross-sectional view of the spool shown alone.

References now made to the drawing in detail, wherein the reference numeral 10 represents an adjustable line float according to the present invention. The same is shown to include a spool 11 which is contained within a float housing 12 and which includes a float housing cover 13 which is of generally semi-cylindrical shape.

Figure 2:
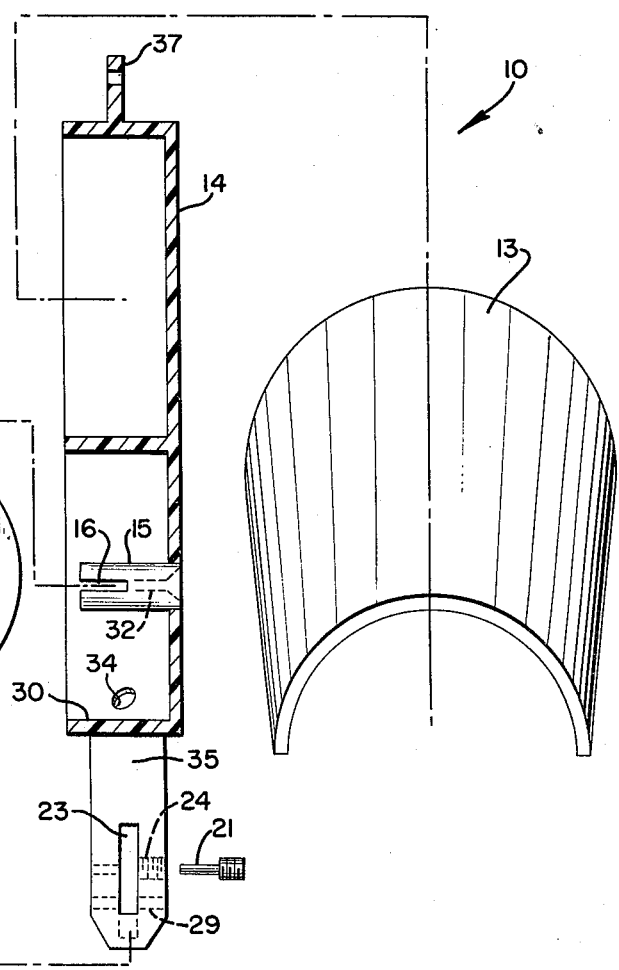
FIG. 2 is an exploded, disassembled view in partial section of the components thereof, with the reel, cover, and trigger rotated 90° for clarity in illustration.

The adjustable line float housing 12 includes a floatation chamber 14 shown in FIG. 2, sealed by cover 13 and is provided near its bottom with an open chamber 30 having a centrally disposed post 15. In this embodiment the post 15 includes a slot 16 which, after the spool 11 is mounted by its central hub 31 on post 15, will accept suitable fastening means such as a spring clip 17 which snappingly engages in bore 32 of the post 15. The spool 11 also includes secondary line length adjustment means, such as two slots 18 and 19 which extend from a peripheral edge thereof. The slots extending radially in a direction toward a center of the spool and serve as a restraining means for a preselected length of the line 33 wound on spool 11 with the free end of line 33 being fed through aperture 34 in the side of open chamber 30, toward the lower end of the float as viewed in the drawings for purposes set forth hereinafter.

The present invention also includes a shaft 35 depending from the housing 12 and carrying a trigger 20 and fastening means such as a trigger supporting pin 21, as well as an axially moveable locking and release collar 22. The shaft 35 includes an angularly disposed slot 29 opening through the end shaft 35 in a direction opposite to an angular notch 26 in trigger 20.

It is to be noted that the present adjustable line float is to be used with a casting rod or the like, carrying a line 36 fixed at its free end to an apertured flange 37 at the top of housing 12. Wherever a long cast is necessary and a certain depth of water is to be attained, the float 10 is cast out and secondary line 33 is fed out, as set forth hereinafter.

In the present invention, the spool 11 holds the secondary fishing line 33. The upper part of the float housing 12 comprises a float chamber 14 while the bottom is recessed to form open chamber 30 for accepting the spool 11. The cover 13 sealingly closes chamber 14 to form a sealed hollow floatation means capable of suspending the float 10 on the surface of the water. The cover 13 can be attached to housing 12 by suitable means such as by adhesive, ultrasonic welding, heat sealing or other known means. The spool holds the secondary fishing line 33 which can be adjusted to a desired depth length by means of the two adjusting slots 18 and 19 where a loop is made in the fishing line 33. The trigger 20 is held in place within a slot 23 by means of suitable fastening means, such as the retaining threaded pin 21 fitted through threaded opening 24.

The free end of secondary fishing line 33 wound on the spool 11 is equipped with a ring 38. Before a cast is made, the line 33 is retrieved through aperture 34 to the spool 11 by rotating spool 11 by means of the finger tipped hole 25 provided in the face of spool 11. The collar 22 is then moved upwardly to retracted position and trigger 20 moved laterally to expose trigger notch 26 and a transverse slot 29 in shaft 35. The ring 38 is now placed in the trigger notch 26 and the cooperating transverse slot 29 in shaft 35. The locking and release collar 22 is then dropped over the trigger 20 to close slot 29 and notch 26 to lock ring 38 in position. It is understood that ring 38 is fastened to a weighted sinker 39, a lead 40 and a hook 41 of a preselected variety. The float is thus ready for a cast. When the float hits the water, the locking and release collar moves upward, releasing the trigger, and the ring thus drops out of the trigger notch, so that the line is thus free to run out from the spool under the weight of the sinker 40 and positions the hook 41 to the depth to which line 33 is set. Thus, adjustable secondary line 33 connected to float 10 will bob on the surface until a fish bites the bait on hook 41 dragging the float 10 below the surface indicating that line 36 should be activated to bring in the catch.

While various changes may be made in the detail construction, it is understood that such changes will be within the spirit and scope of the present invention as is defined by appended claims.

What I claim is:

1. An adjustable line float including a float housing having means for connection to a primary fishing line, said housing including a floatation chamber at one end thereof and an open recess chamber at the other end thereof, a spool carrying an independent secondary line rotatably and removeably mounted in said open recess chamber with the free end of said secondary line connected to weighted means, and release means triggered when said float hits the water to release said weighted secondary line to allow it to sink to a predetermined depth.

2. A float of the type claimed in claim 1 wherein said spool includes a central hollow hub, said open recess chamber having a centrally disposed post for complimentarily accepting said spool hub and moveable fastening means for retaining said spool on said hub.

3. A float of the type claimed in claim 1 wherein said spool includes means for selectively fastening a predetermined length of the secondary line carried by said spool to preset the amount of secondary line to be released when said float hits the water.

4. A float of the type claimed in claim 3 wherein said means for selectively fastening said secondary line includes slot means in one face of said spool through which a loop of said secondary line can be removeably positioned.

5. A float of the type claimed in claim 1 wherein said housing adjacent said open recess chamber includes an outwardly depending shaft carrying said release means in spaced relation to said housing.

6. A float of the type claimed in claim 5 wherein said shaft is provided at its free end with an axially extending slot disposed on a plane lying on said axis and opening through one side of said shaft as well as said free end and at least partially through the opposite side of said shaft, swingable pivoted means positioned within said slot and pivoted to permit lateral movement relative to said shaft to provide open and closed throat means capable of accepting a secondary element connected to said secondary line and release means carried by said shaft for maintaining said throat means closed until said float hits the water and then opens said throat to release said secondary element.

7. A float of the type claimed in claim 6 wherein said secondary element is a generally rigid closed loop connected to the free end of said secondary line.

8. A float of the type claimed in claim 6 wherein said pivoted means includes a first upper portion carrying the pivot point and capable of being totally housed within said slot, a second larger lower portion carrying a laterally extending protuberance and an angularly disposed notch opening through the lower free edge thereof, said shaft having a second slot perpendicular to said first slot and opening through the free end of said shaft, said second slot being angularly disposed relative to the notch in said pivoted means and forming said throat means at their transverse intersection.

9. A float of the type claimed in claim 8 wherein said releaseable means includes means for retaining said first portion of said pivoted member within said shaft slot by acting on said protuberance until impact with the water which temporarily releases said retaining means and opens said throat to release said secondary element connected to the end of the line on said spool.

10. A float of the type claimed in claim 9 wherein said releaseable means includes a first section generally encircling said shaft and the first portion of said pivoted member and axially shiftable therealong and a second section extending laterally from said shaft and capable of being acted on by the impact with the water to shift the first section away from said pivoted member to permit opening of said throat means.

* * * * *